F. A. HELWIG.
AEROPLANE.
APPLICATION FILED MAY 29, 1912.

1,054,968.

Patented Mar. 4, 1913.
6 SHEETS—SHEET 1.

UNITED STATES PATENT OFFICE.

FREDERICK A. HELWIG, OF CHICAGO, ILLINOIS.

AEROPLANE.

1,054,968.  Specification of Letters Patent.  Patented Mar. 4, 1913.

Application filed May 29, 1912. Serial No. 700,372.

*To all whom it may concern:*

Be it known that I, FREDERICK A. HELWIG, a citizen of the United States, and a resident of Chicago, in the county of Cook and State of Illinois, have invented certain new and useful Improvements in Aeroplanes; and I do hereby declare that the following is a full, clear, and exact description thereof, reference being had to the accompanying drawings, and to the letters of reference marked thereon, which form a part of this specification.

This invention relates to improvements in apparatus for aerial navigation and it embraces improvements both in the general construction of that class of such apparatus known as aeroplanes, and in means under the control of the operator for steering the apparatus both horizontally and vertically and for maintaining stability or counteracting the effects of air currents that may tend to tip or tilt the apparatus laterally.

The invention consists in the matters hereinafter described and pointed out in the appended claims.

In the accompanying drawings illustrating my invention:
Fig. 3 is a view in cross-section of the same, taken on line 3—3 of Fig. 1.

As shown in the said drawings, the main frame or body of the apparatus has the form of a horizontally arranged, longitudinally extending, tubular frame-work, formed by means of longitudinal, laterally arranged frame members 5, 5, an upper, central, longitudinal frame member 6, a central, lower frame member 7 and intermediate frame members 8, 8, located at either side of the lower central frame member. Said longitudinal frame members 5, 6, 7 and 8 are connected by annular stiffening ribs 9, 9, 9, and at the forward and rear ends of the tubular frame, said rings are supplemented by longitudinally extending ribs 10, 10. The said forward and rear ends of the frame are made of tapered form, the longitudinal ribs 10, 10, being converged toward the forward and rear ends of the frame to give such tapered shape to the latter. The main frame or body thus constructed, is provided with an exterior covering of sheet material 11, which forms an inclosure for the operator and for the driving mechanism of the apparatus.

At the forward and rear ends of the apparatus, the same is provided with two pairs of transversely extending planes or wing members 15, 15 and 16, 16, which are separated longitudinally from each other. The two planes constituting each pair extend outwardly from the opposite sides of said main frame or body. Above the forwardly supporting planes 15, 15, and parallel therewith, is located a single upper supporting plane 17, which extends across the entire width of the apparatus. Above the rear supporting members 16, 16, is located a like upper supporting member 18, 18, which also extends across the entire width of the apparatus. The forward and rear margins of the several supporting planes 15, 16, 17 and 18 are parallel with each other and transverse to the central longitudinal axis of the apparatus. The frame members by which the planes 15, 15 and 16, 16, are connected with the main frame, 16, 16, are connected with the main frame, consist of transverse, horizontal bars 20, 21, 22 and 23, extending along the front and rear margins of the said planes from side to side of the apparatus. The lateral, longitudinal members 5, 5, of the main frame, converge at their forward and rear ends and are attached to the centers of the transverse bars 20 and 23 at the forward edge of the forward plane and the rear edge of the rear planes, while the transverse bars 21 and 22 at the rear edges of the forward planes and the forward edges of the rear planes, extend across and are attached to both of said longitudinal frame bars 5.

Figure 4:
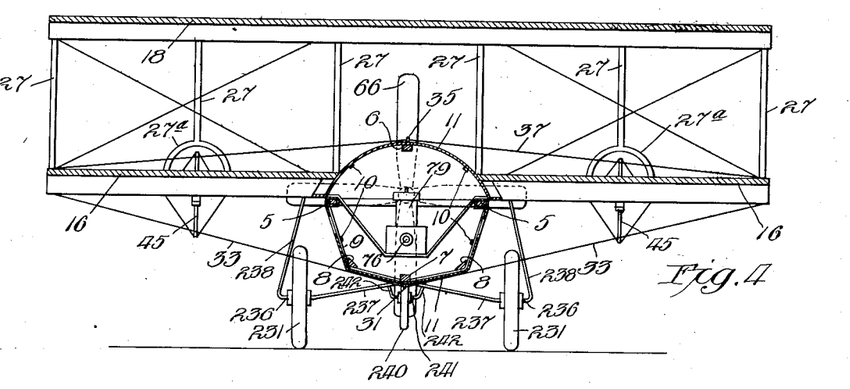
Fig. 4 is a view in cross-section taken on line 4—4 of Fig. 1.
Figure 5:
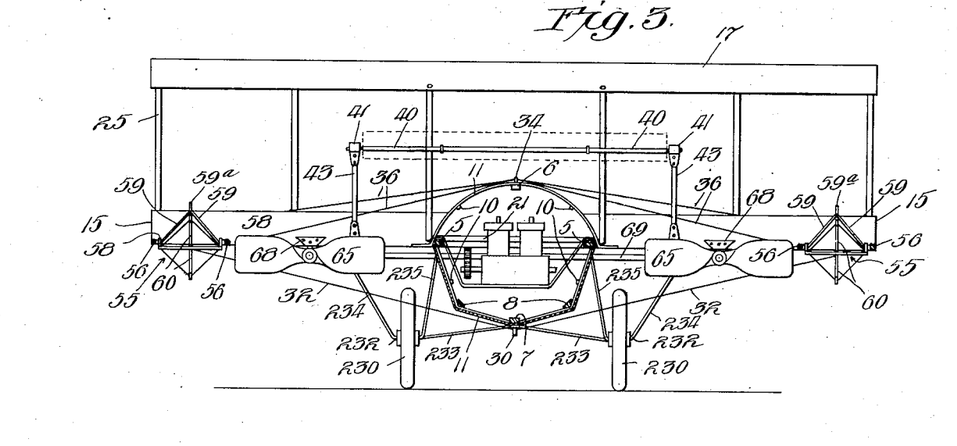
Fig. 5 is a longitudinal section of the apparatus taken on the line 5—5 of Fig. 1.

The upper planes 17 and 18 are connected at their forward and rear margins by means of posts or uprights 24, 25, 26 and 27, with the said transverse bars 20, 21, 22 and 23. The details of the framework and coverings of the planes themselves are not shown in the drawings, and the same may be made in any suitable way. In the sectional views, Figs. 4 and 5, in which the planes are shown in section, the same are shown with parallel top and bottom surfaces, and the details of construction thereof are omitted.

In the lower central, longitudinal member 7 of the main frame, near the forward and rear ends of the same, are secured eyes or fastening members 30, 31, and from said members to the front and rear marginal frame bars of the planes 15, 15 extend obliquely arranged tie rods or wires 32, 32, 32 and 33, 33 33. The upper central, longitudinal frame member 6 is likewise provided near its ends with the eyes or attaching devices 34 and 35, and tie-rods or wires 36, 36 and 37, 37, extend from the same to the marginal frame bars of the front and rear planes.

Figure 1:
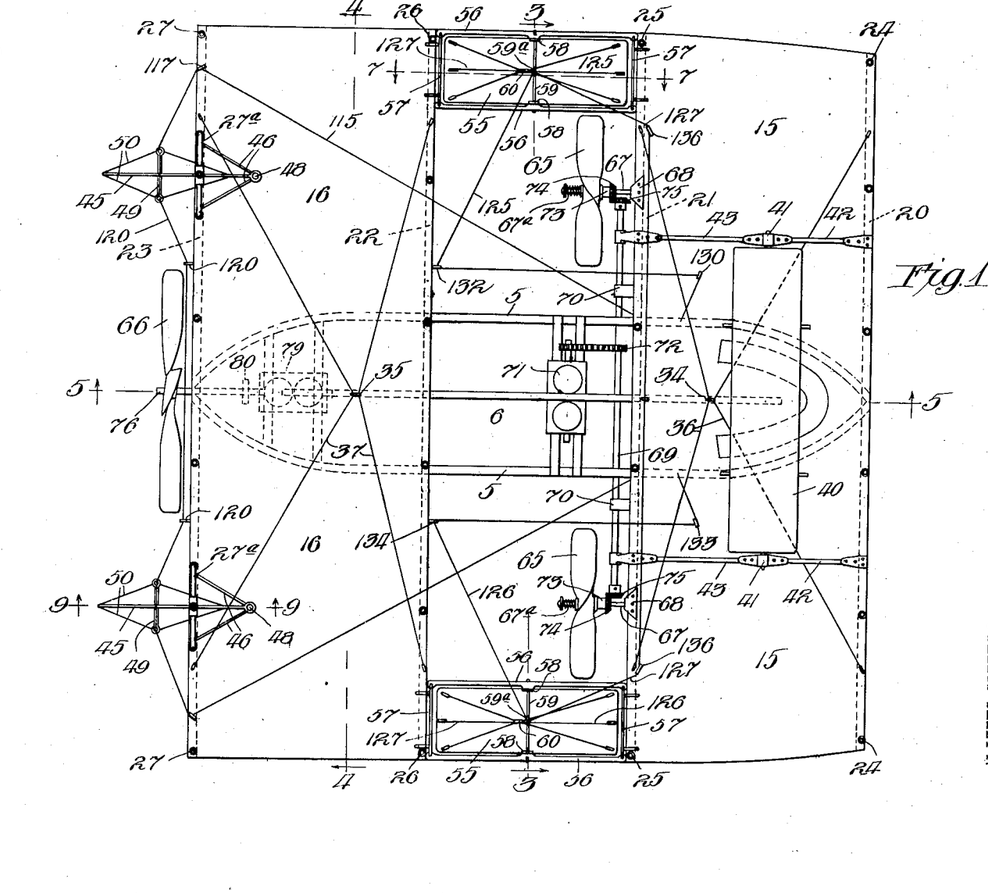
Figure 1 is a plan section of a flying machine or apparatus embodying my invention, taken on the line 1—1 of Fig. 2.
Figure 2:
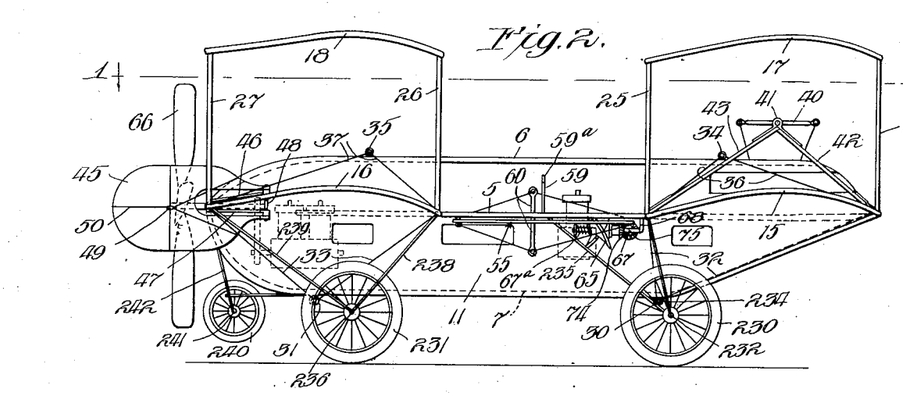
Fig. 2 is a side view of the apparatus.

At the forward end of the apparatus is located a horizontally arranged rudder 40 adapted to be swung or turned on a transverse horizontal axis, and which is under the control of the operator for the purpose of changing the course of the apparatus upwardly or downwardly, or to effect the rising and falling movement of the same. Said rudder 40 is located transversely of the main frame above the forward planes 15, 15 and beneath the upper forward plane 17. Said horizontal rudder 40 is mounted at its ends in bearings 41, 41, each of which is attached to the meeting ends of two inclined struts or braces 42, 43, which extend, and are attached at their lower ends to, the forward and rear marginal bars 20 and 21 of the forward planes, as clearly seen in Figs. 1 and 2.

Figure 6:
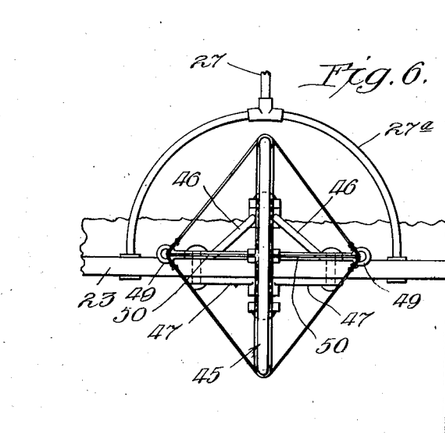
Fig. 6 is a detail view from the rear of one of the rudders and adjacent parts of the frame members.
Figure 9:
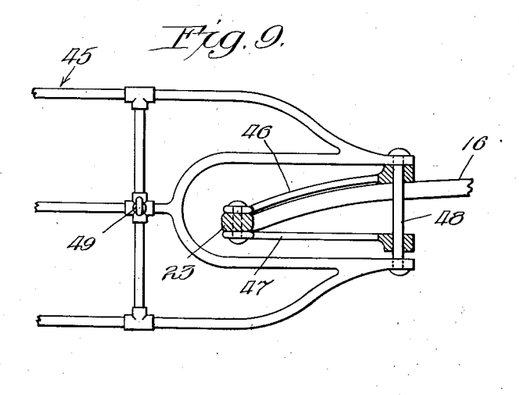
Fig. 9 is a detail section showing the frame of one of the vertical rudders, taken on line 9—9 of Fig. 1.

At the rear end of the apparatus are arranged two vertically arranged steering rudders 45, 45, which are mounted upon, and extend rearwardly from, the rear parts of the planes 16, 16. As clearly seen in Fig. 2, said rudders 45 are pivotally connected to the frames of the planes 16, 16 at points considerably forward of the rear margins of said planes. The means for pivotally mounting said rudders 45 consists of a pair of brackets 46 and 47, each made of V-shape, or with rearwardly diverging arms, located one above and one below the rear margins of the planes. Said brackets have the rear ends of their arms attached rigidly to the frame bar 23, at laterally separated points, and the rudders are provided with arms which extend above and below the said brackets, and are pivotally connected with the same by vertical pivots 48, 48, extending through bearings formed at the forward ends of said brackets, as clearly seen in Fig. 9. The said rudders 45, 45 are preferably located about midway between the inner and outer margins of the planes 16, 16, and, as shown in Fig. 6, the two supporting posts 27 for the upper plane which, if attached directly to the bar 23, would be in position to interfere with the swinging movement of said rudder, are connected with the bar 23, through the medium of a rigid yoke piece 27$^a$ attached to the said frame bar at opposite sides of the rudder. As clearly seen in Figs. 1, 2 and 9, each of said rudders 45 consists of an open metal frame, consisting of marginal, longitudinal and upright members, and is provided with oppositely extending rigid arms 49 that are connected by tension members or wires 50 with the marginal frame of the rudder. Said arms 49 are also adapted for attachment to their outer ends of the steering cords employed in shifting the rudders, as hereinafter described.

Figure 7:
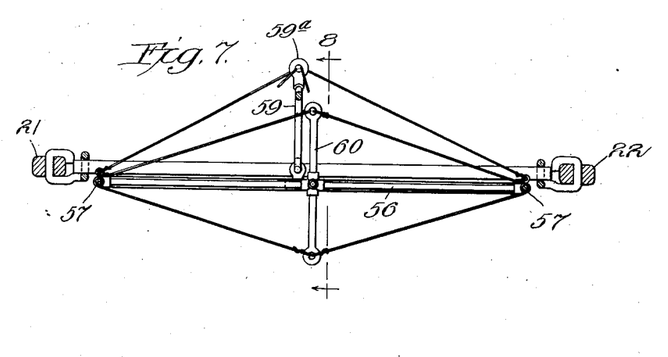
Fig. 7 is a detail section, taken on line 7—7 of Fig. 1, of one of the controlling planes.
Figure 8:
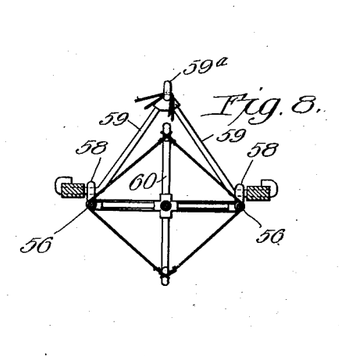
Fig. 8 is a detail section of the same, taken on line 8—8 of Fig. 7.

At the sides of the apparatus, in the spaces between the outer ends of the front and rear planes 15 and 16, are arranged pivoted controlling planes 55, 55, arranged to turn on horizontal axes which extend longitudinally of the planes or wing members, or transversely with respect to the central longitudinal line of the machine. Said controlling planes are shown as mounted in rectangular frames, consisting of longitudinal frame bars 56, 56, and transverse connecting rods 57, 57. Said frames are rigidly connected at their forward and rear ends with the bars 21 and 22, conveniently by the ends of the connecting rods 57, 57, which pass through the ends of the said bars 56, 56, and are bent outwardly or at right angles and are then inserted through and bent partially around the said bars 21 and 22, as clearly seen in the detail view, Fig. 7. The controlling planes 55 consist of rectangular open metal frames, covered with flexible material. The side members of said frames are provided centrally with bearing ears or lugs 58, which are engaged with the end portions of transversely arranged rods 59, which are made of V-form and rigidly secured at their ends to the frame pieces 56, 56, as seen in Fig. 8. Said rods 59, 59 form transverse braces connecting the central parts of said frame bars 56, 56, and are provided with guide loops or eyes 59$^a$ for the cords, by which movement is given to the controlling planes. The controlling planes 55 are provided with central, oppositely extending struts or arms 60, from the outer ends of which oblique tie rods or wires extend to the corners of the planes; this construction being used to give stiffness and rigidity to said controlling planes. Said controlling planes 55, 55 are turned or moved by the operator for the purpose of counteracting any tendency of the apparatus to get out of balance by the rising and falling of the outer or lateral ends of the wing members in the advance movement of the apparatus; said planes 55, 55, in this respect, performing the same function performed by like pivoted controlling planes heretofore used in apparatus of this kind.

The propeller mechanism illustrated embraces two propellers 65, 65 located at the rear of the two forward planes 15, 15, between the central main frame and the two controlling planes 55, 55 and also a single propeller 66, located centrally at the rear of the said main frame. The propellers 65, 65 are mounted on horizontal shafts 67, 67, which are rigidly secured to, and extend rearwardly from, brackets 68, 68, attached to the transverse frame bar 21. The said propellers 65, 65 are driven by means of a transverse, horizontal shaft 69, mounted in bearings 70, 70 on the frame bar 21. Said shaft is actuated by a motor or engine 71 through the medium of a driving belt 72. Said motor 71 is mounted within the main frame or body, and is suitably supported from the frame-members of the same. Each of the propellers 65 is attached to a tube or sleeve 73, which turns on the shaft 67 and is provided with a beveled gear 74 intermeshing with a like gear 75 on the adjacent end of the shaft 69. These driving gears are so arranged that the two propellers 65, 65 are driven or rotated in opposite directions. The single rear propeller 66 is attached to a horizontal shaft 76, which turns in bearings 77 and 78, the rearmost bearings 77 being attached to the transverse frame bar 23 and the forward bearing 78 on a suitably located frame bar 23ᵃ of the main frame. Said propeller 66 is driven by means of a motor or engine 79 mounted in the interior of the main frame; the crank shaft of said motor having driving connection with the shaft 76 through the medium of a driving belt 80.

Figure 10:
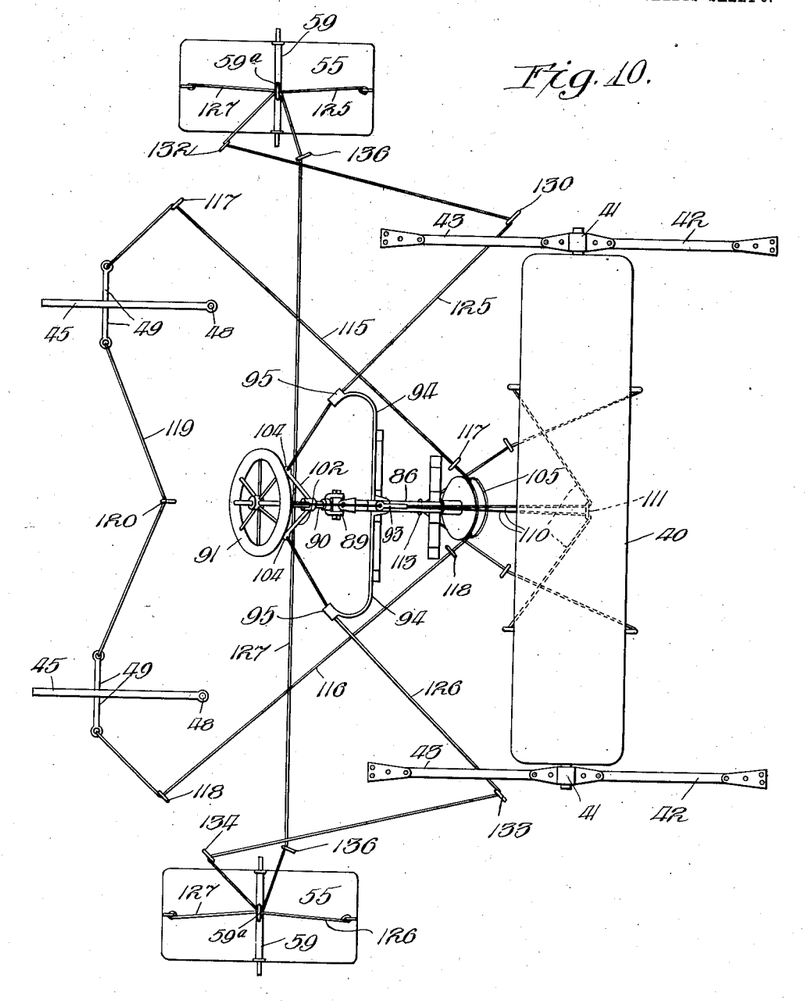
Fig. 10 is a detail plan view showing the steering gear and associated parts separate from the frame of the machine.
Figure 11:
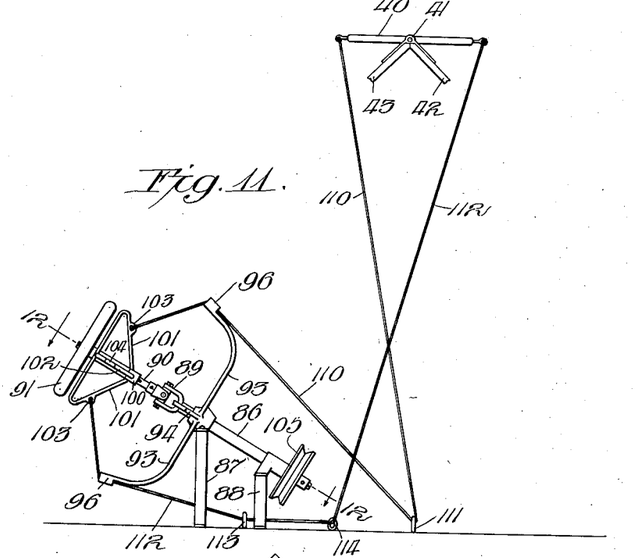
Fig. 11 is a view in side elevation of the parts shown in Fig. 10;
Figure 12:
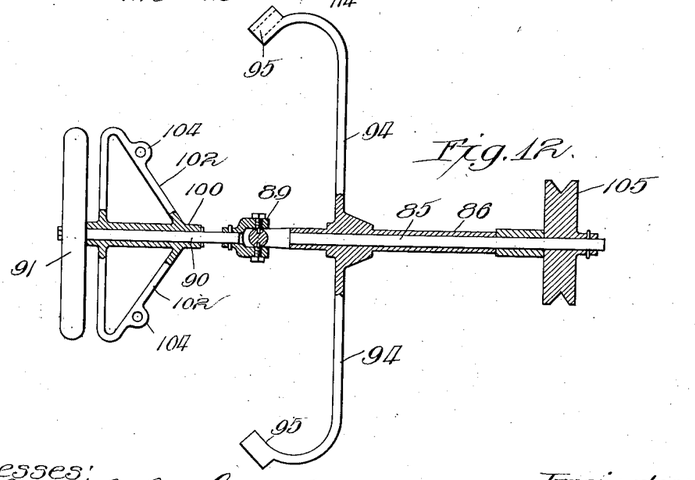
Fig. 12 is an enlarged detail section taken upon line 12—12 of Fig. 11.

I have provided a single operating device, adapted for operating or controlling the horizontal rudder 40, vertical rudders 45, 45, and the pivoted controlling planes 55, 55, which device is shown more particularly in Figs. 10, 11 and 12, and is constructed as follows: Said operating device embraces a rotating shaft 85 mounted to turn or rotate in a fixed sleeve or bearing 86. Said sleeve or bearing is shown as supported in inclined position by means of two standards or brackets 87, 88. Connected with the shaft 85 by means of a universal joint 89 is a laterally oscillating shaft-section 90 which constitutes an extension of said shaft 85, and is provided at its forward end with a rigidly attached hand wheel 91. Said hand wheel is located in a position convenient for an operator seated on a seat within the forward part of the inclosure formed by the main frame, such as is shown at 92 in Fig. 5. The bearing sleeve 86 is provided with four pairs of radially extending, rigidly attached arms, one pair of which 93, 93 extends upwardly and downwardly from the said sleeve, and the other pair of which 94, 94 extends laterally or horizontally from the same. The arms 94, 94 are provided at their ends with eyes or guides 95, 95 and the arms 93, 93 are likewise provided with eyes or guides 96, 96. Mounted on the movable or oscillatory shaft section 90 is a non-rotative sleeve 100. Said sleeve is provided with four radially extending arms, two of which, 101, 101, are located in a vertical plane and extend above and below said sleeve, and the others of which, 102, 102, extend laterally or horizontally from said sleeve. The arms 101 and 102 are provided with eyes 103, 104, by which cords may be connected with the same. On the end of the shaft 85 opposite that with which the oscillatory shaft section 90 is connected, is rigidly secured a wheel or pulley 105. The sleeve 86 is used merely to provide a suitable fixed bearing for the shaft 85, and the arms 94 and 95 are attached thereto merely for convenience, it being obvious that any other suitable form of bearing may be employed to sustain said shaft and that the said arms or the guides thereon may be otherwise suitably supported in the position shown. In other words, as the two pairs of guides 95 and 96 are arranged in fixed relation to the shaft 85, the particular supporting means employed for said guides is immaterial.

Referring now to the devices for operating the horizontal rudder 40, a flexible rope or cord 110 is attached to the uppermost arm 101 of the sleeve 100, passes through the guide 96 on the upwardly extending fixed arm 93 and then passes through a guide 111 on the frame of the apparatus, and then upwardly to one side or margin of the rudder 40. Another cord or rope 112 is secured to the downwardly extending arm 101 on the sleeve 100, is trained through the fixed guide 96, and guides 113 and 114 on the frame of the apparatus, and thence upwardly to the opposite side or margin of said rudder 40. From this construction it will be obvious that if the outer end of the shaft 90 with the sleeve 100 thereon, be raised or lowered, by swinging it in a vertical plane about the universal joint 89, the cords 110 and 112 will be drawn through the several guides described, in such manner as to swing or tilt said horizontal rudder 40 in either direction from its normal or horizontal position. As shown, the several guides for the cords 110 and 112 are so arranged that when the hand wheel 91 is elevated, the forward edge of said rudder will be depressed and when said wheel is moved downwardly, said forward edge will be elevated.

Now referring to the devices for operating the vertical rudders 45, 45, two cords 115, 116 are attached to the periphery of the pulley 105 and led therefrom (Fig. 10) through guides 117, 117 and 118, 118 on the frame of the apparatus, and are attached to the rear parts of said rudders 45, 45; preferably being secured to the arms 49 on the outer faces of said rudders. Another cord 119 extends between and is connected with the inner or adjacent faces of said rudders, the same being likewise shown as connected with the arms 49 projecting from the inner faces of the same. Said cord 119 preferably passes through a guide 120 on the frame of the machine. Said rudders 45, 45 are operated by rotating or turning the hand wheel 91 so as to give rotative movement to the pulley 105, whereby the cords 115, 116 are to an equal extent, wound upon or unwound from said pulley, with the result of swinging said rudders to one side or the other from their central position, as required for steering or giving proper direction to the apparatus.

Now referring to the means for operating the controlling planes 55, two cords 125, 126 are arranged to connect the laterally extending arms 102 on the sleeve 100, with one vertically moving or swinging side or margin of each of the said controlling planes while a third cord 127, is arranged to connect with each other the opposite swinging margins of the said controlling planes. The cord 125 extends from the arm 102 through its associated fixed guide 95 and through two fixed guides 130 and 132 on the frame of the apparatus, through the fixed guide 59ª at the top of the angular brace or cross piece 59, to the forward margin of the controlling plane 55, to which said cord leads. The operating cord 126 extends from the opposite arm 102 through the adjacent fixed guide 95 through guides 133 and 134 on the frame of the apparatus and through the guide 59ª on the transverse member 59 to the forward margin of the other controlling plane 55. The cord 127 is attached at its ends to the rear margins of both the controlling planes and passes through the guides 59ª, 59ª, and through two guides 136, 136 on the frame of the apparatus; said cord 127 operating to transmit motion from one of said controlling planes to the other when the forward edge of either plane is lifted by the action of the cord 125 or 126. When the hand wheel 91 is moved or shifted laterally in a direction to draw inwardly the cord 125, the end of said cord which is attached to the forward end of the controlling plane 55 operates to lift said forward end and to depress the rear end of said plane. When the rear end is depressed, it draws the cord 127 through its guides so as to exert a pull on the rear end of the opposite controlling plane in a direction to lift the same and as this occurs, the forward edge of said opposite plane will be depressed so as to take up the slack in the cord 126. The reverse operation takes place when the hand wheel 91 is shifted laterally in the opposite direction, so as to draw the cord 126 inwardly, the associated controlling plane 55 in that instance being lifted at its forward end and the depression of its rear end operating through the cord 127 to elevate the rear end of the first-named controlling plane.

From the construction in the controlling device described, it will be manifest that the operator may, through the movement of the hand wheel 91 alone, effect the guiding or steering of the aeroplane both vertically and laterally and also maintain the lateral stability of the apparatus. Moreover, the movements required in the said hand wheel are those which will be most easily and naturally accomplished, that is to say, the wheel will be raised or lowered to elevate or depress the forward end of the aeroplane, the wheel will be moved or swung laterally to preserve the lateral balance of the apparatus, and the wheel will be turned in one direction or the other for changing the direction or forward movement of the apparatus to the right or to the left.

While the particular apparatus shown is in the nature of a biplane having upper and lower supporting planes, both at front and rear, the same features of construction described may be employed in a monoplane, or the apparatus may be converted into a monoplane by removing the upper planes 17 and 18, together with the supporting standards for the same.

The apparatus shown is provided with two pairs of wheels 230 and 231, by which it is supported when on ground, and to facilitate the landing of the same after flight. The forward wheels 230 are mounted on short axles 232, 232, which are connected at their inner ends with the lower, central frame bar 7. (Fig. 3) by means of two bars 233, 233. The outer ends of said axles are attached to said oblique bars 234, 234, which are extended outwardly and upwardly, and are attached to the transverse frame bar 21. Other oblique brace bars 235, 235, extend from the inner ends of said axles 232 rearwardly and upwardly, and are attached to the lateral, main, longitudinal frame members 5, 5. The rear wheels 231 are mounted on short axles 236, the inner ends of which are connected by bars 237, 237 with the central lower frame bar 7. The outer ends of said axles 236 are attached to bars 238, which are rigidly attached at their upper ends to the transverse frame bar 22, near its junction with the longitudinal main frame bars 5, 5. The outer ends of said axles are also attached to bars 239, 239, which extend upwardly and rearwardly and are secured to the rear transverse frame bar 23.

In order to prevent the aeroplane, when alighting, or coming to rest on the ground, from tipping or tilting rearwardly by the rising of its forward end, an auxiliary wheel 240 is mounted centrally beneath the rear end of the main frame. Said wheel is shown as mounted on a short axle 241, the ends of which are attached to two upwardly diverging bars 242, attached at their upper ends to the transverse frame bar 23. The said axle 241 is held or braced from backward or forward movement by two brace rods 243, extending from the lower ends of the bars 242, forwardly to the lower longitudinal frame member 7. The said auxiliary wheel 240 is located above the level of the main supporting wheels, so that it will come into action only when the apparatus is tipped or tilted, as described.

On each of the propeller shafts 67, at the rear of the propeller 65, is a coiled spring $67^a$, which acts to hold said propeller normally in its forward position, said propeller being adapted for sliding movement on its said shaft. Said spring permits the propeller to yield backwardly under pressure of air on its forward surfaces, as may occur in volplaning, so as to permit the bevel gears 74 and 75 to become separated from each other and the propeller to become disengaged from the driving shaft at such time.

It is manifest that the details of construction in an apparatus containing the general features set forth may be variously modified in practice, and I do not, therefore, desire to be limited to the particular features and details of construction illustrated as described, except so far as the same may be pointed out in the appended claims.

I claim as my invention:

1. An aeroplane comprising forward and rear transversely extending, longitudinally separated supporting planes, two propellers located between said supporting planes, a single propeller located centrally at the rear of the rearmost supporting plane, a horizontal rudder mounted on a transverse, horizontal axis above the forward supporting plane, and two vertical rudders located at the rear of the rearmost supporting plane at opposite sides of said propeller.

2. An aeroplane comprising forward and rear transversely extending, longitudinally separated supporting planes, two controlling planes located between the outer ends of the said supporting planes, a horizontal rudder mounted to swing on a transverse, horizontal axis above the forward supporting plane, a propeller located centrally at the rear of the rearmost supporting plane, and two steering rudders mounted at the rear margin of the rear supporting plane at opposite sides of said propeller.

3. An aeroplane comprising a central, longitudinal, tubular frame-work or body, forward and rear transversely extending, longitudinally separated supporting planes extending laterally from the sides of the body, two controlling planes located in the spaces between the outer ends of said supporting planes, a horizontal rudder located above the forward end of the central frame, two propellers, located at the rear of the forward supporting planes between the central body and the controlling planes, and a single propeller located at the rear end of said body.

4. An aeroplane comprising a longitudinal, tubular, central frame, forward and rear transversely extending, longitudinally separated supporting planes, two controlling planes located in the spaces between the outer ends of said supporting planes, a horizontally arranged rudder extending transversely above the forward supporting plane, two propellers located between the forward and rear supporting planes at opposite sides of the said central frame, a propeller located centrally at the rear of the rearmost supporting plane, and two vertical rudders located at the rear of said rearmost supporting plane one at each side of said last-mentioned propeller.

5. In an aeroplane, the combination with horizontal and vertical rudders and two controlling planes, of means for operating said rudders and controlling planes, comprising a rotative shaft consisting of a fixed section and an oscillatory section, the latter being connected with the former by a universal joint and provided with a hand wheel, bearings in which the fixed section of said shaft is journaled, a non-rotative sleeve on the oscillatory section of said shaft, said sleeve being provided with four radially extending arms, two of which extend vertically and the other two laterally therefrom, a pulley secured to the fixed section of said shaft, and cords connecting the ends of said arms on the sleeve and said pulley with the horizontal rudder, the controlling planes and the vertical rudder.

6. In an aeroplane, the combination with horizontal and vertical rudders and two controlling planes, of means for operating said rudders and controlling planes, comprising a rotative shaft consisting of a fixed section and an oscillatory section, the latter being connected with the former by a universal joint and provided with a hand wheel, a fixed sleeve in which the fixed section of said shaft is journaled, said fixed sleeve being provided with four radially extending arms, each having an eye in its outer end; two of said arms extending vertically and the other two laterally therefrom, a non-rotative sleeve on the oscillatory section of said shaft, a pulley secured to the fixed section of said shaft, cords passing through the eyes in the vertically extending arms and connecting said non-rotative sleeve with the horizontal rudder, cords passing through the eyes in the laterally extending arms and connecting said non-rotative sleeve with the controlling planes, and cords connecting the said pulley with the vertical rudder.

7. In an aeroplane, a central, longitudinally extending tubular frame or body, comprising laterally spaced side frame members, vertically spaced, upper and lower frame members centrally disposed with respect to said side frame members and located above and below the plane of the same, intermediate frame members located at either side of said lower frame member and below the plane of said side frame members, annular stiffening members adjacent the forward and rearward ends of said tubular frame and connecting said side, upper and lower, and intermediate frame members; the forward and rear ends of all of said frame members being curved inwardly toward the central, longitudinal axis of said tubular frame to give endwise tapered form thereto, and forward and rear supporting planes extending outwardly from opposite sides of said tubular frame, said planes each embracing transverse frame bars extending along the forward and rear margins of the same, the transverse frame bars at the front edge of the forward plane and the rear edge of the rearmost plane being attached to the meeting ends of said side frame members, and the transverse frame bars at the rear edge of the forward plane and the front edge of the rearmost plane extending across the tubular frame and being attached to said side frame members between the ends of the latter.

In testimony, that I, claim the foregoing as my invention I affix my signature in the presence of two witnesses, this 25th day of May, A. D. 1912.

FREDERICK A. HELWIG.

Witnesses:
    CHARLES H. POOLE,
    EUGENE C. WANN.